United States Patent [19]

Priest

[11] 4,274,607
[45] Jun. 23, 1981

[54] GUIDE DEVICE FOR USE IN ELONGATE FILAMENT DISPENSING PACKAGE AND THE LIKE

[75] Inventor: James D. Priest, New Paris, Ohio

[73] Assignee: Belden Corporation, Geneva, Ill.

[21] Appl. No.: 99,464

[22] Filed: Dec. 3, 1979

[51] Int. Cl.³ ............................................ B65H 55/02
[52] U.S. Cl. .................... 242/163; 242/137.1; 242/149; 242/157 R; 242/171; 411/517; 411/908
[58] Field of Search ........... 242/163, 171, 172, 147 R, 242/149, 157 R, 129.8, 137.1, 138, 140, 141, 146, 129, 129.7; 403/254, 259, 261, 263; 85/8.8

[56] References Cited

U.S. PATENT DOCUMENTS

| | | | |
|---|---|---|---|
| 1,056,392 | 3/1913 | Barr et al. ........................ | 85/8.8 X |
| 1,077,453 | 11/1913 | Case ................................ | 242/137.1 |
| 2,278,708 | 4/1942 | Miller .............................. | 85/8.8 X |
| 2,391,307 | 12/1945 | Gwaltney et al. ............... | 242/149 |
| 2,634,922 | 4/1953 | Taylor, Jr. ....................... | 242/163 |
| 2,716,008 | 8/1955 | Taylor, Jr. ....................... | 242/163 |
| 2,738,145 | 3/1956 | Taylor, Jr. ....................... | 242/163 |
| 3,096,951 | 7/1963 | Jenson ............................. | 242/137.1 |
| 3,340,760 | 9/1967 | Wormser ......................... | 85/8.8 |
| 3,516,111 | 6/1970 | Heyman . | |
| 3,683,737 | 8/1972 | Oetiker ............................ | 85/8.8 |
| 3,823,894 | 7/1974 | Frederick et al. ............... | 242/137.1 |
| 3,982,712 | 9/1976 | Bassett ............................. | 242/137.1 |
| 4,009,845 | 3/1977 | Santucci et al. ................. | 242/129.7 |
| 4,019,636 | 4/1977 | Wise ................................ | 242/171 |
| 4,022,399 | 5/1977 | Zajac .............................. | 242/163 |
| 4,057,204 | 11/1977 | Zajac .............................. | 242/163 |

*Primary Examiner*—Stanley N. Gilreath
*Attorney, Agent, or Firm*—Fitch, Even, Tabin, Flannery & Welsh

[57] ABSTRACT

A reusable guide device for use in guiding elongate filament such as wire from a coil contained within a package or carton, the guide device including a tubular guide member adapted to be inserted radially into the coil and having means for securing an outer end of the guide member within an opening in the carton so that the elongate filament may be paid out from the coil through the guide member. Restraint means in the form of a plurality of finger barriers are provided within the guide member and cooperate with the elongate filament to prevent its retraction or withdrawal back into the package.

12 Claims, 6 Drawing Figures

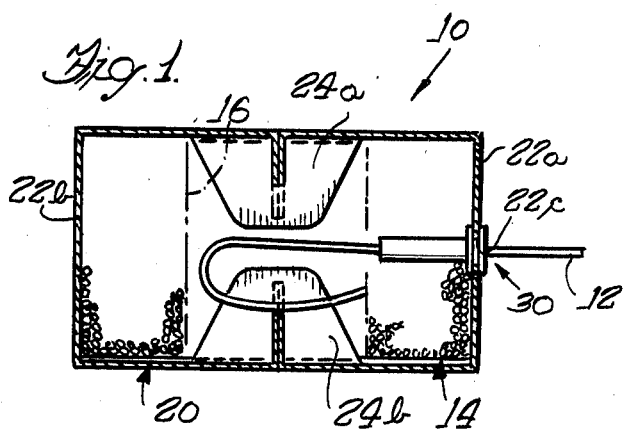
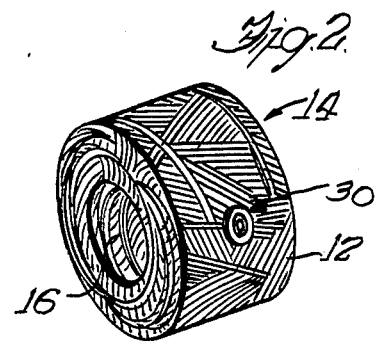
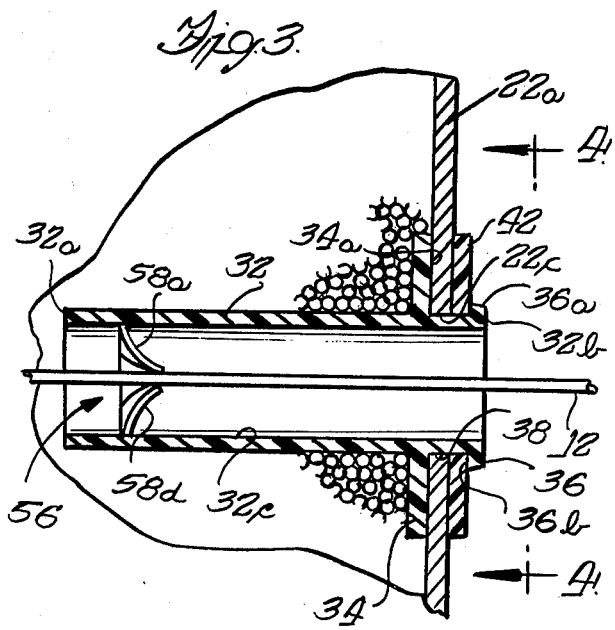
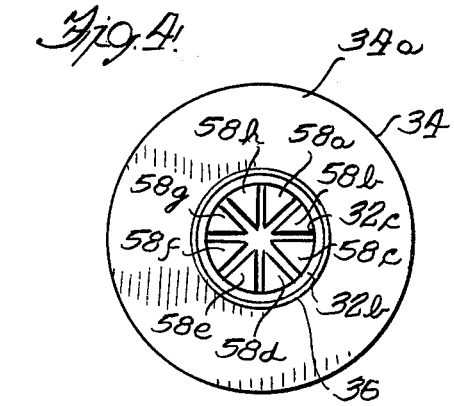
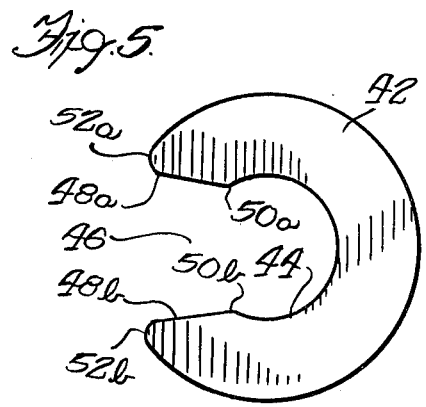
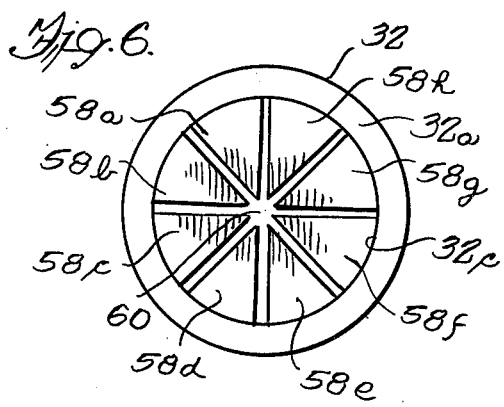

GUIDE DEVICE FOR USE IN ELONGATE FILAMENT DISPENSING PACKAGE AND THE LIKE

The present invention relates generally to dispensing packages for elongate filaments such as wire, and more particularly to a novel guide device for use with such a dispensing package to facilitate guiding of an elongate filament from a wound coil internally of the package.

It is a common practice in the manufacture, shipping and merchandising of many elongate filament type products, such as wire, to wind the filament in a coil form after which the wound filament is placed within a container or package such as a cardboard or fiberboard carton which facilitates shipping of the wound filament and subsequent storing, as well as enabling withdrawal and dispensing of the filament by a retailer to meet purchase requests for specific lengths of the filament. One example of such a dispensing package is disclosed in U.S. Pat. No. 4,019,636, issued Apr. 26, 1977, which is particularly applicable to packages of strand material coiled to form an open center or "air core" coil permitting the inner free end of the elongate filament to be withdrawn from the interior of the coil during pay-out of the filament. In such an open center coil, the filament is conventionally wound so that as it is withdrawn or payed-out from the coil, the wire undergoes one-half twist during removal of one-half of a single coil convolution, and undergoes a reverse direction one-half twist during withdrawal or removal of the remaining one-half of the same single coil convolution so that no residual twist remains in the filament after its withdrawal or pay-out.

Another example of a dispensing package for elongate filament, such as wire, is disclosed in U.S. Pat. No. 3,823,894, issued July 16, 1974, wherein the filament or wire is wound around a drum between end flanges of a reel, after which the wound reel is placed within a carton from which the filament or wire may be withdrawn.

In both of the aforementioned dispensing packages for elongate filament, the filament is passed through a guide device which may take the form of a feed tube inserted radially into the open center wound coil and fitted with the carton, as in U.S. Pat. No. 4,019,636, or may take the form of an eyelet mounted on the carton or a cover member a distance spaced from one of the end flanges of the wound reel, as in U.S. Pat. No. 3,823,894.

In either type of dispensing package for elongate filament, it is highly desirable that the guide device be relatively easy to install and/or attach to the corresponding carton. It is also highly desirable that the guide device be salvageable and reusable with subsequent filament coils and associated packaging cartons. Yet another desirable feature is that such guide devices be adapted to receive an associated elongate filament therethrough to enable pay-out of the filament, while cooperating with the filament to prevent inadvertent and undesired retraction of the filament back into the packaging container during shipping and subsequent storage and dispensing.

One of the primary objects of the present invention is to provide a novel guide device for use with a dispensing package of the aforementioned type, wherein the guide device may be easily assembled with an associated packaging carton, and lends itself to salvaging and reuse.

A more particular object of the present invention is to provide a guide device for use with an elongate filament dispensing package wherein the device includes a tubular sleeve having an end portion enabling insertion into an open center coil of elongate filament, such as wire, and has a flange formed adjacent the opposite end of the sleeve spaced longitudinally inwardly from a retainer rib adapted to be inserted through an opening in an associated carton for cooperation with a snap-on retainer or locking member, and which includes restraint means internally of the sleeve which cooperate with the elongate filament to prevent it from withdrawing back into the package.

A feature of the guide device in accordance with the present invention lies in the provision of a plurality of restraint fingers formed internally of the guide sleeve which are of sufficient flexibility to enable passage of an associated elongate filament therethrough, but which act on the elongate filament to prevent its movement in an opposite direction so as to inhibit its passage back into the package or carton from which it is payed-out.

Further objects and advantages of the present invention, together with the organization and manner of operation thereof, will become apparent from the following detailed description of the invention when taken in conjunction with the accompanying drawings wherein like reference numerals designate like elements throughout the several views, and wherein:

FIG. 1 is a vertical sectional view of a dispensing package for elongate filament employing a filament guide device constructed in accordance with the present invention;

FIG. 2 is a perspective view illustrating an open center wound coil of elongate filament having a guide device of the present invention inserted radially therein preparatory to placing the coil within a packaging carton;

FIG. 3 is a fragmentary vertical sectional view, on an enlarged scale, taken along the longitudinal axis of the guide device illustrated in FIG. 1 and showing an elongate filament being passed through the guide device;

FIG. 4 is an end view of the guide device of FIG. 3, taken substantially along line 4—4 of FIG. 3, but with the guide device removed from the carton side panel and with the snap-on retainer removed;

FIG. 5 is a detail view of the snap-on retainer or locking member illustrated in FIG. 3; and FIG. 6 is a view, on an enlarged scale, from the inner end of the guide tube to better illustrate the restraint fingers internally of the guide tube.

Referring now to the drawing, and in particular to FIGS. 1 and 2, a guide device constructed in accordance with the present invention is shown, by way of illustration, as being employed in a dispensing package, indicated generally at 10, for packaging an elongate filament 12 in wound coil form from which the filament may be withdrawn in desired lengths. In the illustrated embodiment, the elongate filament 12, which may comprise cable or wire or other strand material capable of being wound in coil form, is wound in any suitable manner into a coil, such as indicated at 14 in FIG. 2, that has an open center and that is capable of having the filament 12 payed-out from the interior core of the coil. The coil 14 is preferably wound in a conventional manner to form a substantial number of wound convolutions of the filament so that the filament can be payed-out from the interior of the coil without any residual twist in the filament as it is withdrawn from the coil.

For purposes of shipping and storage, as well as use during pay-out or withdrawal of the elongate filament 12, the coil 14 is assembled within a carton, indicated generally at 20, which may take any desired form but which, in the illustrated embodiment, is made of a suitable strength fiberboard formable into a generally rectangular carton having a perimeter of four connected walls or side panels, two of which are indicated at 22a and 22b, formed end-to-end around the coil. The side panels have suitable flaps connected along fold lines to the upper and lower longitudinal edges thereof to enable folding to form closed top and bottom walls of the container and also preferably form tapered bosses 24a and 24b which extend into the interior of the open center core 16 in the coil 14. The illustrated carton 20 is described in greater detail in the aforementioned U.S. Pat. No. 4,019,636 which is incorporated herein by reference for that purpose.

In accordance with the present invention, a guide device, indicated generally at 30, is inserted radially into the coil 14 and provides a radial channel or guide passage through the body of the coil to the open center 16 thereof through which the free end of the elongate filament 12 is fed for withdrawing the filament from the package 10. In the illustrated embodiment, as the strand material is withdrawn from the interior of the coil 14, the tapered bosses 24a,b guide the elongate filament into the gap between them for withdrawal from the package 10 through the guide device 30.

With particular reference to FIGS. 3-5, taken in conjunction with FIG. 1, the guide device 30, which may alternatively be termed pay-out tube or re-entrant tube, is preferably made of a nonmetallic material, such as polypropylene or other suitable plastic material, and includes a cylindrical tubular guide sleeve 32 having a first end 32a which, in the illustrated embodiment, serves as the entrance end of the guide device. The tubular sleeve 32 has a second end 32b which serves as the exit end of the guide device. The tubular guide sleeve 32 is adapted to be inserted radially into a wound coil, such as coil 14, after forming a radial opening therein as with a tapered rod in a known manner. The tubular sleeve 32 is preferably made of sufficient length to extend approximately the radial width of an initially wound coil 14, such as illustrated in FIG. 1. The extent of insertion of the tubular sleeve 32 is limited by engagement of an annular flange 34 formed on the sleeve 32 in longitudinally spaced relation from the first end 32a of the sleeve. The annular flange 34, which preferably is formed integral with the sleeve 32, is also spaced longitudinally a predetermined distance from the second or exit end 32b of the tubular sleeve on which an annular retainer rim 36 is formed, the annular retainer 36 having substantially less radial projection from the axis of the tube 32 than the flange 34, as best seen in FIG. 3. The retainer 36, which may comprise a plurality of arcuate segments formed on the exit end of the tube 32 rather than a fully annular retainer as illustrated, has an outer peripheral surface 36a which is preferably tapered inwardly in the direction of the end 32b at an angle of approximately 15° to assist in entry of the end 32b through an opening in the carton side panel with which the guide device 10 is employed, as will become apparent hereinbelow. The rearward edge of the retainer 36 is defined by a planar annular stop surface 36b which establishes with an opposing planar surface 34a of the flange 34 an annular locking recess 38 adjacent the exit end of the sleeve 32.

The annular retainer 36 is of less radial extent than the flange 34 to enable insertion of the retainer 36 through a suitable opening 22c formed generally centrally in the wall panel 22a of carton 20 with the flange 34 abutting the inner surface of the side panel during placement of the coil 14 and associated guide device within the carton 20. The distance between the stop surface 36b on retainer 36 and the opposing surface 34a of flange 34, which establishes the longitudinal width of the locking recess 38, is established so that when the exit end of the guide sleeve is inserted through the opening 22c, a predetermined portion of the locking recess 38 is exposed for releasable locking cooperation with a retainer or locking member 42 to affix the guide device 10 to the associated side panel 22a. The retaining or locking member 42 is also preferably made of a suitable plastic material, such as polypropylene, and may be formed of a generally circular configuration having a concentric generally circular opening 44 formed therethrough. The center opening 44 has a diameter just slightly larger than the diameter of the annular surface on sleeve 32 defining the locking recess 38. A radial slot or opening 46 defined by outwardly diverging edge surfaces 48a and 48b is formed in the locking member 42 to intersect the inner opening 44 and establish retaining edges 50a and 50b which are spaced apart a distance less than the diameter of the opening 44. Rounded corners 52a and 52b are formed at the juncture of the outwardly diverging edges 48a and 48b of slot 46 with the outer periphery of the locking member so that these corner edges will not dig into the carton material when the locking member 42 is assembled onto the sleeve 32 within the locking recess 38 after inserting the exit end of the sleeve through the opening 22c in the carton side panel to expose a sufficient length of the locking recess 38 to releasably receive the locking member thereon. The width or thickness of locking member 42 and the exposed length of locking recess 38 are sized so that the locking member cooperates with flange 34 to affix the guide device 10 to the side panel of the carton.

In assembling a coil 14 of wound filament and its associated guide device 30 into a dispensing carton, a short length of the filament 12 is initially threaded through the length of the guide device 30 and releasably attached to the outer end of the guide sleeve 32 as by a piece of tape or the like. In accordance with an important feature of the invention, restraint means, indicated generally at 56, are disposed within the tubular sleeve 32 for cooperation with the elongate filament 12 when it is passed through the sleeve in a predetermined axial direction, as from the entrance end 32a toward the exit end 32b, to restrain or prevent movement of the elongate filament in an opposite direction, thus preventing the filament from being drawn back into the package 10. This feature is particularly advantageous during shipment and storage of the dispensing package, as well as during dispensing of selected lengths of the filament.

With particular reference to FIGS. 3, 4 and 6, the restraint means 56 includes a plurality of radially inwardly extending generally pie-shaped flexible fingers, of which there are eight such fingers indicated at 58a-h in the illustrated embodiment. The flexible restraint fingers 58a-h are spaced circumferentially from each other so that a relatively narrow radial slot is formed between each adjacent pair of fingers. The flexible fingers are preferably formed integral with the tubular sleeve 32 and are of less radial dimension, each from its base connection to the sleeve 32 its apex, than the radius of the inner cylindrical surface 32c of sleeve 32 so as to form a central opening 60 which facilitates initial threading of the filament 12 axially through the sleeve 32. The central opening 60 defined between the apexes of the flexible fingers 58a–h has a diameter less than the diameter of the filament 12 so that insertion of the filament through the guide device causes the fingers 58a–h to be flexed in the direction of movement of the filament, as best illustrated in FIG. 3. The fingers 58a–h are of sufficient rigidity to exert a friction force on the filament 12 which substantially restrains or inhibits movement of the filament in a reverse direction should the elongate filament tend to retract back into the carton 20 as from residual twist or memory in the filament tending to return the filament back to its wound condition in the carton, particularly in the case of wire.

Thus, in accordance with the present invention, a guide device is provided which finds particular application with an open center coiled elongate filament such as cable or wire disposed within a carton to enable dispensing of the filament, the guide device being cooperable with a side panel of the carton and facilitating withdrawal of the elongate filament from its associated coil while restraining movement of the filament in a reverse direction. A particular advantage of the guide device 30 is that the various components, i.e., the sleeve 32 and retainer ring 34, do not require a complex or "blind" orientation to enable attachment of the guide device to an associated container carton with which the guide is employed. Additionally, by employing the retainer ring 42 for releasable cooperation with the locking recess 38 and retainer 36 on the guide sleeve 32, the guide device may be readily disassembled and reused, thus providing a relatively inexpensive and salvageable guide and restraint means for elongate filament dispensing packages.

While a preferred embodiment of the invention has been illustrated and described, it will be understood that changes and modifications may be made therein without departing from the invention in its broader aspects. Various features of the invention are defined in the following claims.

What is claimed is:

1. A device for guiding an elongate filament from a coil of said filament, comprising a tubular guide sleeve having first and second ends, a radially disposed retainer formed on said sleeve adjacent one of said ends, said retainer having an outer peripheral surface tapered inwardly toward said one end of said sleeve and defining a substantially planar stop surface spaced a predetermined longitudinal distance from said one end of said sleeve, a radial annular flange formed on said sleeve in predetermined longitudinally spaced relation from said stop surface on said retainer and defining with said retainer a locking recess therebetween, said retainer being of lesser radial extent than said flange so as to enable insertion of said one of said ends and said retainer through an opening of predetermined diameter in a panel member with said flange abutting the side of the panel from which said retainer is inserted, a locking member adapted for releasable cooperation with said locking recess and said retainer to maintain said sleeve in mounted relation on said panel member when said one of said ends is inserted through said opening in said panel member, and restraint means comprising a plurality of generally radially inwardly directed fingers disposed internally of said tubular sleeve and extending about substantially the full periphery of the inner surface of said sleeve, said fingers being spaced longitudinally from said retainer and flange toward the other end of said sleeve and having sufficient flexibility to enable insertion of an elongate filament generally centrally therebetween in a predetermined direction while maintaining frictional engagement with the peripheral surface of the elongate filament so as to substantially restrain movement of the filament in a direction reverse to said predetermined direction.

2. A guide device as defined in claim 1 wherein said tubular sleeve has a substantially straight longitudinal axis, said flange and said retainer lying in planes disposed transverse to said longitudinal axis.

3. A guide device as defined in claim 1 wherein said locking recess is defined by an annular surface disposed between said retainer and said flange, said locking member being generally planar and having a generally circular opening therethrough of a radius slightly greater than the radius of said locking recess but less than the radial extent of said retainer, said circular opening being intersected by a generally radial slot enabling movement of said locking member into assembled cooperation with said locking recess through movement of said locking member in a plane substantially transverse to the longitudinal axis of said sleeve.

4. A guide device as defined in claim 1 wherein said fingers are generally pie-shaped and each is separated from the next adjacent fingers by generally radial slots.

5. A guide device as defined in claim 4 wherein said radial fingers define a generally circular opening between the apexes thereof which is of smaller area than the cross sectional area of the elongate filament.

6. A guide device as defined in claim 1 wherein said retainer and said radial flange are formed integral with said tubular guide sleeve.

7. A guide device as defined in claim 6 wherein said guide sleeve and integral retainer and sleeve and said locking member are made of relatively rigid plastic material.

8. In a dispensing package including a carton having an open center coiled elongate filament therein capable of being payed out from the interior of the package without rotation of the coil, the carton including at least one wall panel having an aperture of predetermined diameter therein through which the elongate filament may be passed during pay out from the coil, the combination therewith comprising a guide device including a tubular sleeve having first and second ends, a radial retainer formed on said sleeve adjacent one of said ends, said retainer having an outer peripheral surface tapered inwardly toward said one end of said sleeve and defining a substantially planar stop surface spaced a predetermined longitudinal distance from said one end of said sleeve, a radial annular flange formed on said sleeve in predetermined longitudinally spaced relation from said stop surface on said retainer and defining with said retainer a locking recess therebetween, said retainer being of smaller radial extent than said flange and being sized to enable insertion through said aperture in said wall panel with said flange abutting the side of said panel from which the retainer is inserted, a substantially planar locking member mounted on said sleeve within said locking recess and cooperable with said retainer and said flange to maintain said sleeve in attached relation to said panel, and restraint means comprising a plurality of generally radially inwardly directed fingers disposed internally of said sleeve and extending about substantially the full periphery of the inner surface of said sleeve, said fingers being spaced longitudinally from said retainer and flange toward the other end of said guide sleeve, said fingers having sufficient flexibility to enable insertion of said elongate filament centrally therebetween in a predetermined axial direction during pay out from said coil, said radial fingers being cooperable with said elongate filament to substantially restrain movement of said filament in a direction opposite to said predetermined direction whereby to substantially prevent said elongate filament from withdrawing back into the package.

9. The combination as defined in claim 8 wherein said locking recess is defined by an annular surface disposed between said retainer and said flange, said locking member being generally planar and having a generally circular opening therethrough of a radius slightly greater than the radius of said locking recess but less than the radial extent of said retainer, said circular opening being intersected by a generally radial slot enabling movement of said locking member into assembled cooperation with said locking recess through movement of said locking member in a plane substantially transverse to the longitudinal axis of said sleeve.

10. The combination as defined in claim 8 wherein said fingers are generally pie-shaped and each is separated from the next adjacent fingers by generally radial slots.

11. The combination as defined in claim 8 wherein said retainer and said radial flange are formed integral with said tubular guide sleeve.

12. The combination as defined in claim 11 wherein said guide sleeve and integral retainer and sleeve and said locking member are made of relatively rigid plastic material.

* * * * *